US005982103A

United States Patent [19]
Mosebrook et al.

[11] Patent Number: 5,982,103
[45] Date of Patent: Nov. 9, 1999

[54] COMPACT RADIO FREQUENCY TRANSMITTING AND RECEIVING ANTENNA AND CONTROL DEVICE EMPLOYING SAME

[75] Inventors: Donald R. Mosebrook, Bethlehem, Pa.;
Richard C. Compton, Ithaca, N.Y.;
Joel S. Spira, Coopersburg, Pa.

[73] Assignee: Lutron Electronics Co., Inc., Coopersburg, Pa.

[21] Appl. No.: 09/013,125

[22] Filed: Jan. 26, 1998

Related U.S. Application Data

[62] Division of application No. 08/598,239, Feb. 7, 1996, Pat. No. 5,736,965.

[51] Int. Cl.$^6$ ....................................................... H01Q 1/24
[52] U.S. Cl. ........................ 315/149; 315/312; 343/702; 455/90
[58] Field of Search ................................... 315/295, 312, 315/149, 158, 294, 292, 299; 362/802; 343/702; 455/90

[56] References Cited

U.S. PATENT DOCUMENTS 4,334,171   6/1982   Parman et al. ........................... 315/199

*Primary Examiner*—David H. Vu
*Attorney, Agent, or Firm*—Ostrolenk, Faber, Gerb & Soffen, LLP

[57] ABSTRACT

A radio frequency antenna for use with a wall mounted transmitter and/or receiver for receiving and/or transmitting signals adapted to control a control device and/or indicate status of the control device. The antenna includes an insulating substrate sized to fit within an area defined by a faceplate sized to cover an outwardly facing opening of an electrical wallbox. Conductors are disposed on both sides of the substrate forming a capacitive component. At least one of the conductors is adapted to radiate radio frequency energy into the environment. The one conductor is electrically coupled to the other conductor, and the one conductor has a pattern such that the conductor is absent in areas so as to provide the antenna with an inductive component. The at least one conductor further provides a connection to the transmitter and/or receiver. The antenna provides an antenna near-field which is substantially at the edges of the substrate and which provides insubstantial electromagnetic field coupling to an electronic circuit disposed adjacent the antenna connected to the antenna and further provides a radiated field substantially isotropic in the antenna far-field.

38 Claims, 8 Drawing Sheets

COMPACT RADIO FREQUENCY TRANSMITTING AND RECEIVING ANTENNA AND CONTROL DEVICE EMPLOYING SAME

This is a division of application Ser. No. 08/598,239, filed Feb. 7, 1996 now U.S. Pat. No. 5,736,965.

BACKGROUND OF THE INVENTION

The present invention relates to antennas and, in particular, to radio frequency antennas for transmitting and receiving radio frequency signals. Even more particularly, the present invention relates to a compact antenna which is provided for use in connection with a radio frequency controlled lighting control system. In particular, the present invention relates to an antenna which is provided on a lighting control device, for example, a light dimmer, and which receives and transmits radio frequency signals for controlling a lamp and communicating status of the lamp e.g., on, off and intensity level. The radio frequency signals are used to control from a remote location the status of the lamp connected to the light dimmer and also to provide information back to a master location concerning the status of the controlled lamp. The device at the master location may also employ the antenna according to the invention.

The invention also relates to a control device employing the antenna that can be mounted in a standard electrical wall box. In particular, the invention also relates to a local electrical control device capable of remotely controlling one or more electric lamps and adapted to be mounted in a standard electrical wall box and receiving and transmitting signals via the antenna. The invention further relates to a master control device capable of remotely controlling one or more electrical control devices and adapted to be mounted in a standard electrical wall box and employing the antenna to transmit to and receive signals from a local electrical control device which responds to the control signals from the master device.

Although the present invention is directed to an antenna for use in a lighting control system, the antenna of the present invention can be applied to the communication of signals relating to the control and status of other devices, for example, communication equipment, motors, security systems, appliances, HVAC systems (heating, ventilating and air conditioning).

The present invention is directed to an antenna of compact design which can be included within the lighting control device, for example, a light dimmer, and which fits into standard electrical wall boxes. The invention is also directed to the lighting control device itself, whether a master or local (remote) unit. The invention is of particular use in a system using radio frequency signals to control the status of lamps. In such a system, the conventional manually controlled hardwired lighting control devices, for example, wall switches and dimmers, are replaced by a dimmer having a control circuit and an antenna according to the present invention. The system in which the antenna according to the present invention is used is thus provided to enable an existing building lighting system (or other electrical/ electronic devices) to be controlled remotely from various locations, without requiring hardwiring of the building to incorporate the necessary control system to accomplish remote control of lighting fixtures or other devices. Accordingly, in the system in which the antenna or lighting control device of the present invention is used, the lighting control device, e.g., a light dimmer which replaces a conventional light switch/dimmer, contains an antenna according to the present invention, the necessary actuators for accomplishing manual control of the light fixture, as well as a control circuit and RF circuit for allowing remote control via signals received and transmitted by the antenna of the lighting control device. The antenna and control device fit within a standard electrical wall box (or the antenna is sized so that it fits within the area defined by the faceplate of the wallbox), allowing the conventional lighting control device to be removed and replaced by the lighting control device according to the invention. Similarly, a master unit according to the invention having actuators thereon and an antenna for transmitting signals to the local control devices and receiving status signals from the local control devices is also adapted, according to one embodiment of the invention, to be disposed in a conventional electrical wall box. The antenna can be disposed completely or partly within the wallbox or it is sized so as to fit partly or completely outside the wall box at the wallbox opening but within the area defined by the faceplate of the wallbox.

In accordance with the present invention, the antenna is of compact size, fits within a standard electrical wall box or within the area defined by the faceplate of the wallbox and is a part of the electrical control device for controlling the lamp. The electrical control device also fits substantially within the standard electrical wall box.

There are various systems known in the prior art which allow for remote control of lamps without hardwiring control lines to the lighting control devices.

In one prior art system, a user can install a so called three-way electrical switch, i.e., an additional light control switch to an existing hardwired single control system by replacing an existing manually operated lighting control device with a lighting control device having a radio frequency receiver incorporated therein. The replacement lighting control device is hardwired into the electrical system in the same way as the conventional device to control the lamp. The radio frequency receiver is responsive to radio frequency signals generated by a remote battery powered switching device having a transmitter which can be conveniently affixed to a building wall at another location, thereby to provide the three-way switch circuit. The additional battery powered lighting control device has a manually operated lever, which when operated, sends an RF signal to the other electrical control device which is hardwired into the building's electrical system. The hardwired device will then toggle in response from its present state to the opposite state, i.e., from on to off or off to on. Thus, either switching device, the hardwired replacement or the battery powered device, can operate the lamp. Accordingly, a three-way electrical switch can be provided into an existing electrical system without hardwiring the three-way switch into the system.

In this prior art system, having the battery powered transmitting switch and the hardwired switch including a receiver, the hardwired receiving switch includes a whip antenna made from a piece of insulated wire which is allowed to dangle out of the electrical box either outside the building wall or inside the wall. In the case where the whip antenna is allowed to dangle outside the wall, an unattractive, aesthetically displeasing appearance is obtained. In the case where the whip antenna is allowed to dangle inside the wall, although hidden, the wire creates reception and installation problems as well as a danger that the wire may become shorted to other cables or grounds, presenting an electrical hazard or preventing the antenna from working.

In this prior art system, the battery powered transmitter generally includes a printed circuit board loop antenna. Another problem with this system is that the battery powered switch and hardwired switch must be located within a certain distance of each other in order for the system to operate.

In another prior art system, known as the X10 system, standard lighting control devices are replaced by lighting control devices operating via a power line carrier (PLC) communication system, i.e., information for operating the lighting control devices is provided over the building's existing power line by a power line carrier (PLC). In addition, in some of these systems, an RF communications link is also provided so that a hand-held remote control master device can be used to operate the various lighting control devices. In these systems, an RF repeater may also be provided. In the X10 system, only one-way communications is provided so that a master unit is not apprised by a lighting control device of the status of the controlled light fixtures.

In the X10 system, a radio frequency to PLC bridge is provided to convert radio frequency signals into power line carrier (PLC) communications signals. The RF to PLC bridge plugs into an existing wall outlet and provides the PLC carrier onto the electrical power line to be received by the controlled lighting control device. The antenna of the RF to PLC bridge is also, as in the case of the three-way switch described above, visible. Typically, the RF to PLC bridge comprises a box which is plugged into an existing wall electrical outlet, and has an antenna for receiving signals from the master controller or a repeater.

In addition to the X10 system, there are also known two-way communications links for providing, in general, home automation. These include the Electronic Industries Association Consumer Electronics Bus (CEBus) (EIAIS-60) protocols for radio frequency media, power line carrier media, infrared media and twisted pair media, and the Echelon Corporation LONworks. Intellon Corporation provides transceivers that comply with the CEBus standards for radio frequency and power line carrier. Echelon provides transceivers that comply with their communication protocol. None of these radio frequency transceivers package easily within the allowed area of a device as described by NEMA standards that fit in an electrical wallbox.

In addition to the above, a system known as the Smart House supplied by Smart House LP is also available. This system comprises a wired system and, accordingly, would entail expensive alteration and dislocation if applied to the control of electrical devices, particularly lighting in a home.

In addition to the above, the assignee of the present application offers systems known as HomeWorks, NetWorks and LuMaster which are hard-wired control systems controlling lighting devices. Although these systems are suitable for new construction, they entail major alteration and dislocation when applied to existing homes.

Also becoming available are wireless local area networks (LANs) for computer systems, which employ radio frequency communication methods ensuring that all nodes of the network can communicate with each other. See, for example, Electronic Design, Jun. 26, 1995, page 55.

SUMMARY OF THE INVENTION

It is, accordingly, an object of the present invention to provide an antenna for an RF communications system for controlling lamps and other electrical devices, and which antenna forms an integral part of a control device (e.g. a lighting control device) which can be completely installed in a conventional electrical box and having no visible antenna.

It is a further object of the present invention to provide an antenna as part of a lighting control device wherein the antenna is sufficiently small to fit within the area defined by the faceplate of the wallbox outside the opening of the wallbox with the remainder of the control device disposed in the wallbox. In this way, the antenna, although outside the wallbox, is concealed behind the faceplate.

It is yet still a further object of the present invention to provide an antenna providing two way transmit/receive communications of radio frequency signals, thereby allowing the reception of signals to operate a lamp from a remote location as well as a transmit function to provide back to the remote location the status of the affected lamp.

It is yet still a further object of the present invention to provide such an antenna which provides an evanescent or fringe near-field substantially on the edges and a far-field substantially isotropic radiation pattern for Particular use in confined areas such as buildings.

It is yet another object of the present invention to provide such an antenna which has a narrow bandwidth, i.e., is unaffected by extrinsic and out-of-band electromagnetic interference, as well as interference caused by accompanying control circuits.

It is yet still another object of the present invention to provide such an antenna which is sufficiently small to fit into confined spaces and, in is particular, to fit, as an integral part of a lighting control device such as a lamp dimmer, into standard electrical wall boxes.

It is yet still another object of the present invention to provide an antenna which is capable of reception/transmission effectively despite the size of the antenna being much smaller than the operating wavelength in free space and so does not contain a resonant length.

It is yet still a further object of the present invention to provide an antenna which is of particular use with the local controls of an RF controlled lighting system.

It is still yet another object of the present invention to provide an antenna sized so as to take maximum advantage of the small space available in electrical wall boxes, but allowing other components including mechanical actuation components and user indicators, for example, lighted optical waveguides, to be incorporated in the wall box.

It is yet still another object of the present invention to provide an antenna having a fixed impedance insensitive to the environment in which it is installed, i.e, relatively insensitive to the material of the electrical box in which it is installed and the presence of other environmental factors such as persons or other objects in proximity to the antenna.

It is yet still a further object of the present invention to provide an antenna having an essentially capacitive impedance which is compensated by built-in inductive loading provided by the configuration of a printed circuit board.

It is yet still a further object of the present invention to provide a printed circuit board antenna (PCB).

The evanescent fields are substantially on the edges and top side of the PCB. Because evanescent fields do not exist substantially on the underside of the PCB, very little coupling exists between the antenna board and other parts of the control device, e.g., the RF board, power board and microcontroller. This is desirable because it keeps noise generated by the microcontroller and other circuitry from coupling into the antenna and desensitizing the receiver.

In the preferred embodiment, the copper clad printed circuit board substrate is made of a low loss dielectric material and the copper plating should not be solder plated since the solder is more resistive than the copper, and at the radio frequencies used, the current flows only in a small skin depth at the surface of the conductor.

It is yet still another object of the present invention to provide an antenna which can be used in an RF controlled lighting system, which antenna is concealed from view and thus is unlike the prior art systems which have dangling or aesthetically displeasing visible antennas.

It is yet still an additional object of the invention to provide an antenna that can be fed by an unbalanced transmission line. This is desirable because it does not require an expensive balun.

It is yet still an additional object of the present invention to provide an antenna having evanescent fields substantially on the edges.

It is yet still another object of the present invention to provide a cost effective antenna which eliminates the need for expensive and bulky isolation from the AC power network, but yet which is capable of being completely insulated from the user.

It is yet still a further object of the present invention to provide an antenna which is capable of receiving and transmitting radio frequency control signals to control the operation of two wire light dimmers, i.e., dimmers not requiring a neutral wire.

It is yet still a further object of the present invention to provide an electrical control device adapted to be mounted substantially within an electrical wall box.

It is yet still a further object of the present invention to provide such a control device which can function as a local control for an electric lamp, receiving signals without wires from a remote master control and having no external antenna, and preferably, according to the invention, transmitting signals to the master control to indicate status of the controlled lamp.

It s yet still a further object of the present invention to provide a master control device which can be disposed in a standard electrical wall box without having any external antenna, and which device transmits control signals, directly or indirectly, for example, via a repeater, to at least one remotely located local electrical control device. Preferably, the master control device is capable of receiving signals from the local control devices relating to the status of the controlled electrical lamp.

The objects of the invention are achieved by a radio frequency antenna for use with a wall mounted transmitter and/or receiver for receiving and/or transmitting signals adapted to control a control device and/or indicate status of the control device, the antenna comprising, an insulating substrate sized to fit within an area defined by a faceplate sized to cover an outwardly facing opening of an electrical wallbox, the substrate having edges, conductors disposed on both sides of the substrate forming a capacitive component, at least one of the conductors adapted to radiate radio frequency energy into the environment, said one conductor being electrically coupled to the other conductor, said one conductor having a pattern such that the conductor is absent in areas so as to provide the antenna with an inductive component, the at least one conductor further providing a connection to the transmitter and/or receiver, and the antenna providing a near-field which is substantially at the edges and which provides insubstantial electromagnetic field coupling to an electronic circuit disposed adjacent the antenna connected to the antenna and further providing a radiated field substantially isotropic in a far-field.

In the preferred embodiment of the antenna, the transmitter and/or receiver is disposed in an electrical wallbox. The control devices may be disposed adjacent the antenna or remotely from the antenna. In the preferred embodiment, the control device comprises a lighting control having a manual actuator, the lighting control further being controlled by the transmitter and/or receiver, the substrate providing clearance for the manual actuator of the lighting control.

In the preferred embodiment of the antenna, the one conductor includes longitudinally extending slots where the conductor is absent to provide said inductive component.

Still further according to the preferred embodiment of the antenna, the slots are formed in the shape of an H-pattern, with areas of the conductor adjacent the H-pattern forming side radiators for providing evanescent fields substantially on the edges.

The above and other objects of the present invention are furthermore achieved by an electrical control device adapted to be mounted at least partly within an electrical wall box for controlling the status of a controlled electrical device, the electrical control device comprising, a housing, a support yoke coupled to the housing, the support yoke having a fastening device for coupling the yoke to the electrical wall box, a controllably conductive device contained within the housing for controlling the status of the controlled electrical device, a control circuit contained in the housing, a transmitter/receiver contained in the housing, an antenna, sized to fit within an area defined by a faceplate for an outwardly facing opening of said wallbox, said antenna adapted to receive signals from a remote control device and transmit signals to said remote control device, the antenna being coupled to the transmitter/receiver, the transmitter/receiver coupling said signals to said control circuit for remotely controlling said controllably conductive device, said transmitter/receiver receiving signals from said control circuit for providing signals to said remote control device to indicate the status of said controlled electrical device.

In the preferred embodiment of the electrical control device, the antenna comprises an insulating substrate having edges, conductors disposed on both sides is of the substrate forming a capacitive component, at least one of the conductors adapted to radiate radio frequency energy into the environment, said one conductor being electrically coupled to the other conductor, said one conductor having a pattern such that the conductor is absent in areas so as to provide the antenna with an inductive component, the at least one conductor further providing a connection to the transmitter/receiver; and the antenna providing a near-field which is substantially at the edges and which provides insubstantial electromagnetic field coupling to an electronic circuit disposed adjacent the antenna connected to the antenna and further providing a radiated field substantially isotropic in a far-field.

The objects of the invention are also achieved by a remote control device adapted to be mounted at least partly within an electrical wall box, and adapted to control without a wire connection, an electrical control device connected to a controlled electrical device, the remote control device comprising, a housing, a support yoke coupled to the housing, the support yoke having a fastening device for coupling the yoke to the electrical wall box, a control circuit contained in the housing, a transmitter/receiver contained in the housing, an antenna, sized to fit within an area defined by a faceplate for an outwardly facing opening of said wallbox, an outer bezel disposed over said antenna, at least one actuator extending from said bezel, the actuator being coupled to said control circuit to provide a signal thereto to control the status of the controlled electrical device, said antenna adapted to transmit signals to said control device and receive signals from said control device, the antenna being coupled to the transmitter/receiver, the transmitter/receiver coupling said signals from said control circuit to the antenna for remotely controlling the control device thereby to control the status of the controlled electrical device and said transmitter/receiver receiving signals from said antenna from the control device for providing signals to said control circuit to indicate the status of said controlled electrical device.

In the preferred embodiment of the remote control device, the antenna comprises an insulating substrate having edges, conductors disposed on both sides of the substrate forming a capacitive component, at least one of the conductors adapted to radiate radio frequency energy into the environment, said one conductor being electrically coupled to the other conductor, said one conductor having a pattern such that the conductor is absent in areas so as to provide the antenna with an inductive component, the one conductor further providing a connection to the transmitter/receiver; and the antenna providing a near-field which is substantially at the edges and which provides insubstantial electromagnetic field coupling to an electronic circuit disposed adjacent the antenna connected to the antenna and further providing a radiated field substantially isotropic in a far-field.

According to another aspect, the invention comprises a radio frequency antenna for use with a transmitter and/or receiver for receiving and/or transmitting radio frequency signals, the antenna comprising, an insulating substrate sized to fit within an area defined by a faceplate sized to cover an outwardly facing opening of an electrical wallbox, the substrate having edges, conductors disposed on both sides of the substrate forming a capacitive component, at least one of the conductors adapted to radiate radio frequency energy into the environment, said one conductor being electrically coupled to the other conductor, said one conductor having a pattern such that the conductor is absent in areas so as to provide the antenna with an inductive component, at least one conductor further providing a connection to the transmitter and/or receiver, the antenna providing a near-field which is substantially at the edges and which provides insubstantial electromagnetic field coupling to an electronic circuit disposed adjacent the antenna connected to the antenna and further providing a radiated field substantially isotropic in a far-field, the substrate having a length and a width, the length and width of the substrate being substantially less than a transmit and/or receive free space wavelength of radiation processed by the transmitter and/or receiver.

Other features and advantages of the present invention will become apparent from the following detailed description of the invention which refers to the accompanying drawings.

BRIEF DESCRIPTION OF THE DRAWINGS

The invention will now be described in greater detail in the following detailed description with reference to the drawings in which.

Figure 1:
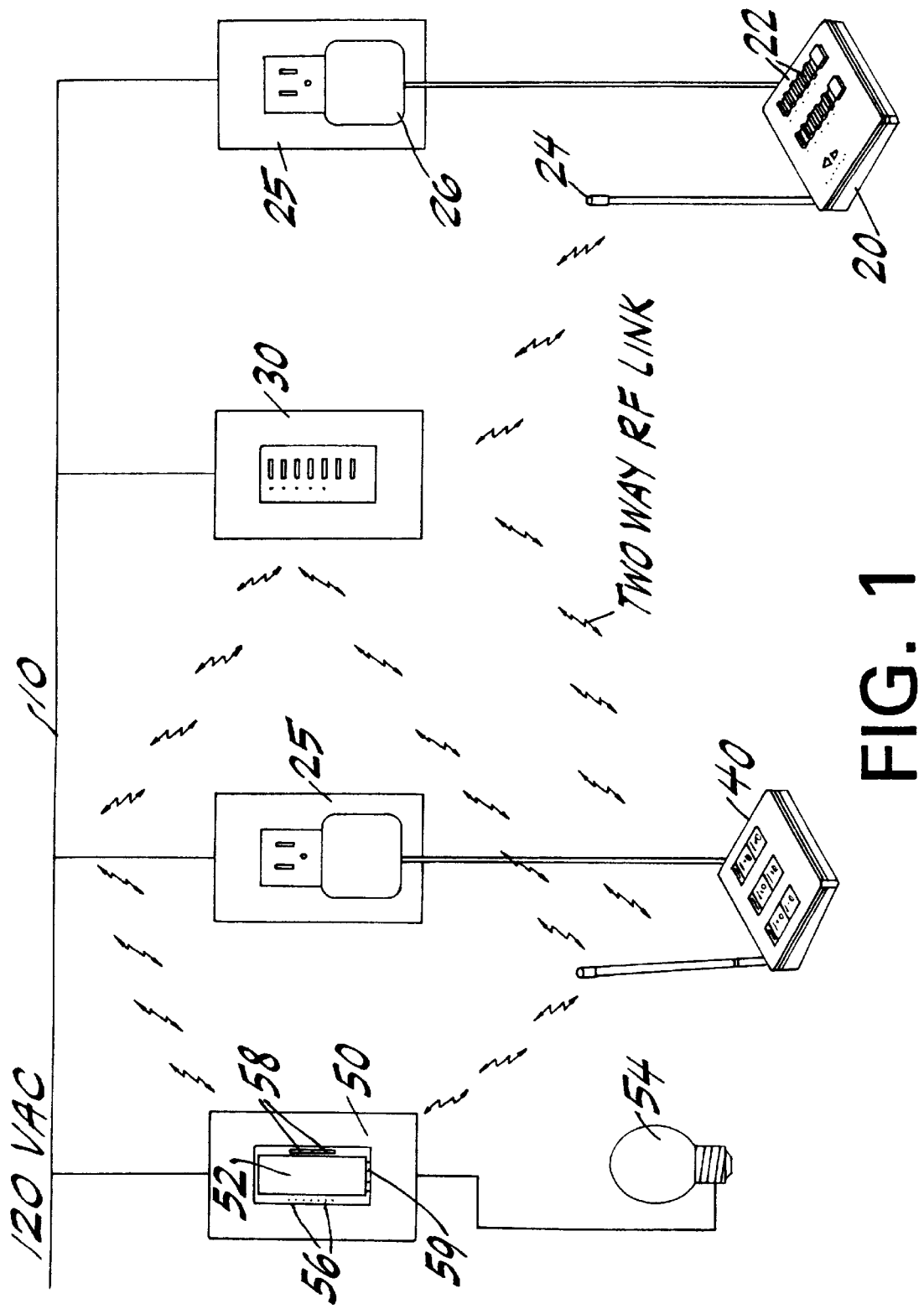
FIG. 1 shows a block diagram of a radio frequency controlled lighting system making use of the antenna according to the present invention.

Other objects, features and advantages of the present invention will become apparent from the detailed description which follows.

DETAILED DESCRIPTION OF THE INVENTION

With reference now to the drawings, the antenna and control unit according to the present invention comprise components of a radio frequency controlled lighting control system. Such a system is connected into a building's existing hardwired electrical system 10, shown in FIG. 1. With the exception of installing lighting control devices to replace the existing standard lighting control switches, however, no change in the building wiring is necessary to implement the control functions. Accordingly, the system shown in FIG. 1 can be used to provide remote control of a building lighting system without installing any additional wires. This is particularly useful to retrofit an existing building for remote control without expensive construction work and rewiring. All control functions are accomplished by radio frequency signals between master control devices, lighting control devices and repeaters, as appropriate.

According to such a system, a master control device 20 may be installed having a plurality of controls and status indicators 22 which control various lamps assigned to the various control buttons. The assignment of the particular lamps to particular control buttons can be in accordance with a computer program which is described in co-pending commonly assigned application Ser. No. 08/599,097 filed concurrently herewith. The master device 20 includes an antenna 24 for receiving and transmitting radio frequency signals and plugs into a wall outlet 25 for power via an AC transformer 26. If desired, additional master units 20 can be provided. Another master unit or units 30 can also be provided. The master unit 30 according to the invention is identified as a wall mount master, because it is installable into an existing electrical wall box. Such a wall mount master 30 will include an antenna according to the present invention which is hidden from view and which receives and transmits radio frequency signals for control and status functions. Any number of master units, either of the tabletop type or wall-mount type can be provided in the system.

According to the system described, a repeater 40 is also provided to help insure that it is insured that every component of the system will receive the RF communication signals for control purposes. The repeater is described in co-pending commonly assigned patent application Ser. No. 08/598,234 filed concurrently herewith.

At least one lighting control device 50 is provided which is capable of manual actuation via a manual control button 52, but which is also capable of receiving radio frequency signals from the master units 20, 30 or repeater 40, to control the status of a lamp 54. In addition, the lighting control device 50 is capable of transmitting radio frequency signals to the repeater 40 and master units 20 and 30 to inform the master units of the status of the affected lamps 54. The lighting control device 50 may comprise a dimmer, for example, and may include a plurality of status indicating devices, for example, light emitting diodes 56, which indicates the intensity setting of the lamp 54 to the user. In addition, the lighting control device 50 includes a means 58 for setting the intensity level. For example, such means 58 may comprise an up/down rocker switch. Furthermore, an on/off switch 59 may be provided to disable the operation of the lamp, as desired. A plurality of lighting control devices 50 controlling respective lamps 54 can be provided according to the system described.

In addition, the power line system 10 and/or any other metal objects can act as an RF scatterer, collecting power from any of the transmitters and then re-radiating this energy to be received by the dimmer 50, repeater 40, or masters 20 and 30.

A lighting control device having the general appearance of the lighting control device 50 shown in FIG. 1 is the Maestro line, sold by the assignee of this patent application. However, the Maestro lighting control device is not provided with any means for radio frequency communication, but merely is referred to here as an example of a lighting control device which has the general appearance of the lighting control device 50. Additionally, the Maestro device can share some of the same mechanical/electrical components as the lighting control device described herein having the antenna according to the invention provided as a part thereof.

Figure 2:
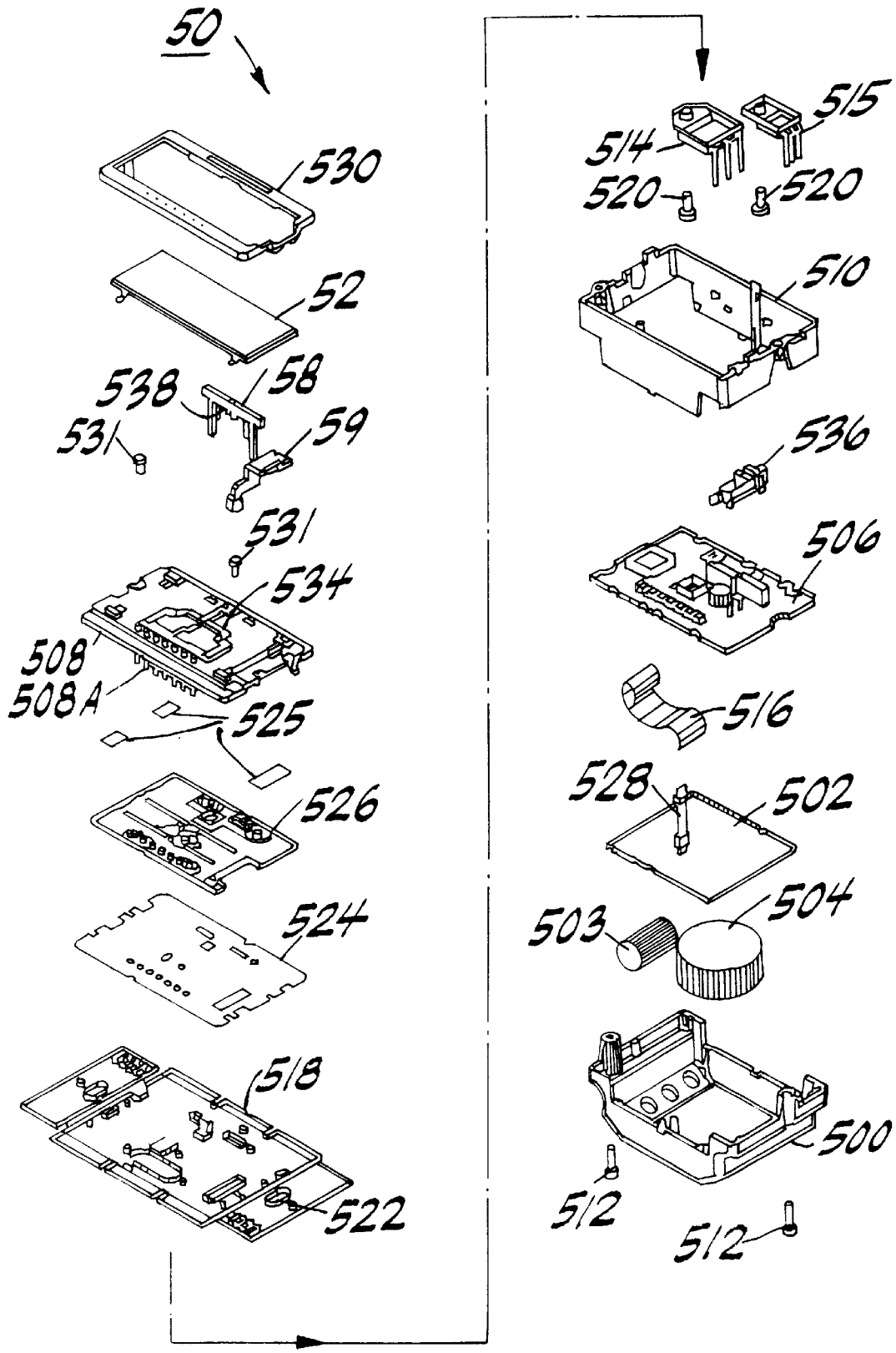
FIG. 2 shows an exploded view of a light dimmer according to the present invention incorporating the antenna according to the present invention.

FIG. 2 is an exploded view of lighting control device 50 shown in FIG. 1. The lighting control device 50 includes an insulating backcover cap 500 to or through which the power electrical wires can be provided. Into the backcover cap 500, an RF board 502 is provided, coupled to the antenna, to be described in greater detail below. The purpose of the RF board 502 is to receive radio frequency signals from the antenna for controlling the operation of the lamp as well as for feeding radio frequency signals to the antenna for transmission back to the master devices.

Also provided in the backcover cap 500 is RFI choke 504 and a power supply filter 503, which are provided to appropriately filter the alternating current energy which is supplied to the lighting control device for power via building electrical system 10.

Also provided into the backcover cap is a power and control board 506, which includes a suitable power supply and regulator and a microprocessor control circuit that is controlled by signals received from the RF board and which transmits signals to the RF board concerning the status of the controlled lamp.

The power and control board 506 includes a plurality of light emitting diodes which indicate the status of the affected lamp. A sub-bezel 508 is provided above the light emitting diodes and includes molded-in light-pipes 508A to transmit the light from each of the light emitting diodes externally of the device so that the light emitted by the light emitting diodes is visible to an operator of the device. Preferably, the sub-bezel can be made of a clear plastic such as Lexan™ or other polycarbonate to perform the light pipe function. Additionally, the sub-bezel 508 also functions to insulate antenna board 526 from the user. The antenna board 526 according to the preferred embodiment is coupled to the A-C supply, so such insulation is required according to the preferred embodiment. Coupled to the backcover cap 500 is a backcover ring, also of an insulating material, and indicated at 510 in FIG. 2. The backcover cap 500 and backcover ring 510 are held together by appropriate means, for example, screws 512. The lamp controlled by the power and control board 506 is controlled by a semiconductor power device 514, which may comprise a triac. Semiconductor power device 515 may be an FET used as part of the cower supply regulator for power and control board 506. The RF board 502 may be coupled to the power and control board 506 via a flex ribbon electrical connector 516 as shown.

Power semiconductor devices 514 and 515 are fastened to a metal yoke 518 via screws 520 to dissipate heat. The yoke 518 thus comprises a heat sink and also functions as the means by which the lighting control device 50 is mounted into an electrical wall box. Accordingly, yoke 518 includes two screw holes 522 receiving mounting screws for mounting the yoke and accordingly, the device 50 into the electrical wall box in conventional fashion. Disposed above the yoke 518 and insulating the yoke 518 from components disposed above the yoke is an insulating member 524 which may be made of an insulating material such as Kapton® as manufactured by DuPont. The insulating member 524 as well as the yoke 518 include a plurality of holes therethrough for the light pipes 508A as well as for wiring for connections to a printed circuit antenna board 526 disposed above the insulating member 524. A three pin electrical feed 528 is provided for connecting the antenna printed circuit board 526 to the RF board 502. The sub-bezel 508 disposed above the antenna printed circuit board and made of a suitable insulating material, has disposed thereon an actuating button 52 operating through the intermediary of a molded-in hinge bar 534 to control a switch. The switch is operated by hinge bar 534 and provides signals to the microprocessor which controls the operation of the power semiconductor device 514 to control the on/off status of the lighting control device. In addition, a rocker arm control 538 is provided having operating surfaces 58 for operating switches for increasing or decreasing the intensity level of the connected lamp.

Airgap actuator 59 operates airgap leaf switch 536 to provide a positive airgap system off for system maintenance.

In addition to insulating sub-bezel 508, insulating members 525 may be provided, as necessary, to further insulate antenna board 526. These members 525 may be used to block small apertures in sub-bezel 508 provided for molding clearances.

Bezel 530 is provided as an outer covering for aesthetic purposes and may be suitably colored. Preferably, bezel 530 and members 52, 59 and 538 are each factory installed in one of selected colors so that an appropriate aesthetic appearance can be obtained. These respective components are interchangeable so that different colors or color combinations can be provided.

The elements 530, 52, 536, 59 and 538 are substantially conventional and their functions are known from the Maestro line of light dimmers sold by the assignee of the present application.

The antenna printed circuit board 526 is coupled to the yoke in an insulating fashion preferably via adhesive on both sides of insulating member 524. Sub-bezel 508 is coupled to yoke 518 via screws 531 and insulates the antenna from the external environment. In the preferred embodiment, the antenna is coupled to the power line and is accordingly at the power line potential. The sub-bezel 508, however, completely insulates the antenna from the user to prevent electrical shock. This construction saves the need for expensive and bulky electrical isolation of the antenna from the power line.

As shown in FIG. 2, the antenna printed circuit board 526 is completely enclosed within the lighting control device 50. There is no dangling antenna as in the prior art or any external antenna. The device 50 fits within a standard electrical wallbox. Alternatively, antenna board 526 can be sized so that it is somewhat larger than the outwardly facing opening in the electrical wallbox. In such case, the antenna board 526 is mounted just above the opening and should be sized so that it is no larger than the faceplate for the wallbox opening, and thus concealed behind the faceplate.

The antenna described provides an evanescent or fringe near-field substantially on the edges of the printed circuit board (PCB) and a far-field isotropic radiation pattern. The evanescent fields are substantially on the edges and top side of the PCB. The evanescent fields do not radiate, decay quickly and are substantially negligible on the underside of the PCB. Because the fields are substantially negligible on the underside of the PCB, very little coupling exists between the antenna board and other parts of the control device, e.g., the RF board, power board and microcontroller. This is desirable because, it keeps noise generated by the microcontroller and other circuitry from coupling into the antenna and desensitizing the receiver.

According to the preferred embodiment of the antenna according to the invention, the length and width of the substrate are substantially less than the transmit and/or receive free space wavelength of radiation processed by the transmitter and/or receiver. Illustratively, the operating frequency is 418 MHz and the length and width are respectively, approximately 2¼ inches and 1½ inches. In the illustrated embodiment, the length and width are both less than about one-tenth the free space wavelength of the 418 MHz RF energy.

Figure 3:
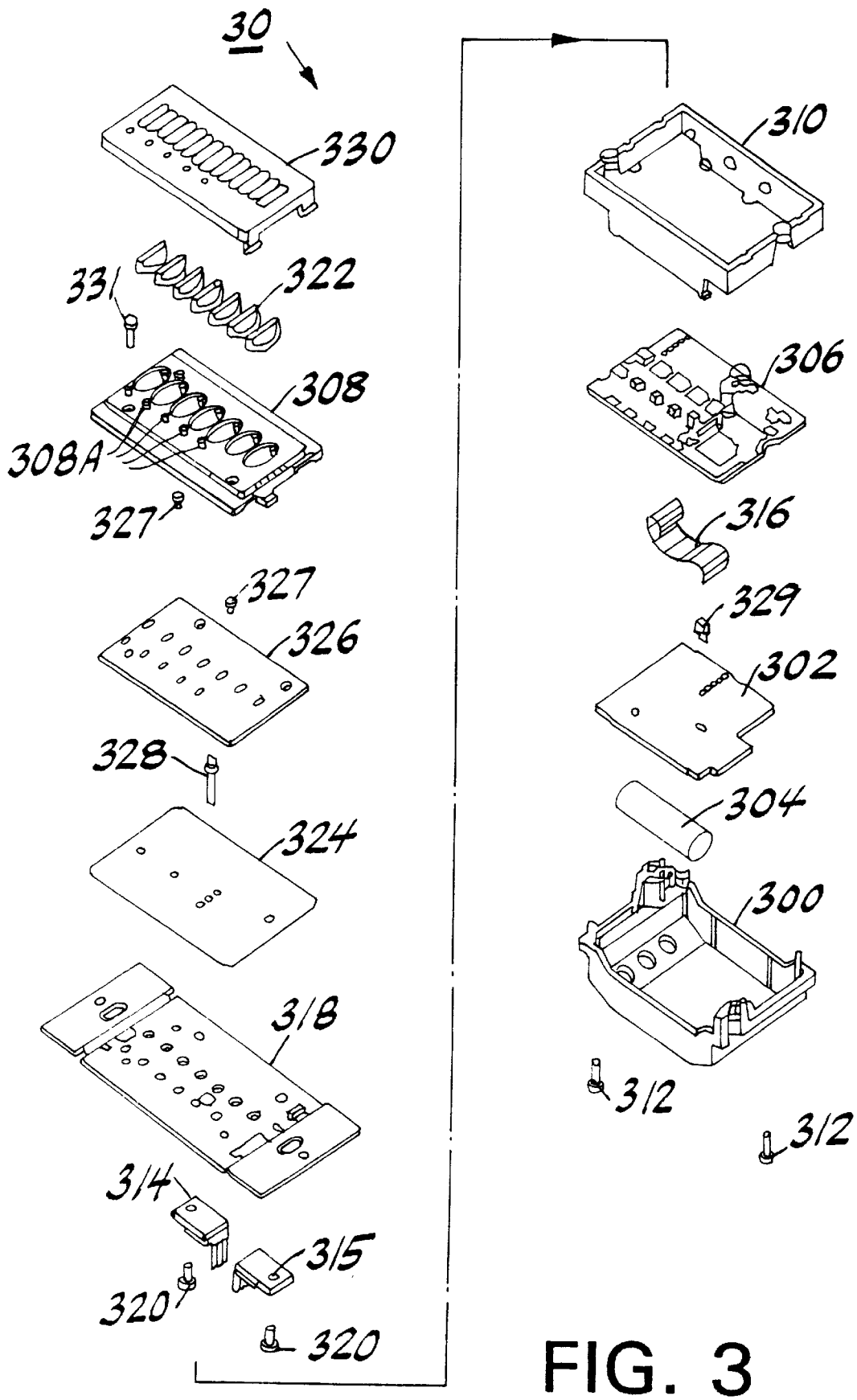
FIG. 3 shows an exploded view of a master control station according to the present invention incorporating the antenna according to the present invention.

In similar fashion to the lighting control device 50, shown in FIG. 2, the wall mounted master unit 30 shown in FIG. 3 includes a backcover 300, a filter capacitor 304, an RF board 302, a flex connector 316, a power and control PC board 306, a backcover ring 310, power semiconductor control device 314 and voltage regulation device 315, a yoke 318, a Kapton® (as manufactured by DuPont) insulator 324, an antenna PC board 326 as well as a different design sub-bezel 308 incorporating light pipes 308A, control buttons 322 and a bezel 330. A screw 331 fastens the sub-bezel 308 to the yoke and antenna screws 327 may be used to fasten the antenna to the yoke 318. Alternatively, adhesive can be used as in the embodiment of the dimmer of FIG. 2. A three-pin feed 328 is provided for electrically coupling the antenna PC board 326 via a three-pin feed socket 329 to the RF board 302. As in the lighting control device 50, screws 320 are provided for fastening the semiconductor power device 314 and regulator 315 to the yoke 318. The backcover 300 can be suitably fastened to the backcover ring via screws 312.

Although the design of the antenna PC boards 326 and 526 are somewhat different due to mechanical differences such as the number and function of the control buttons provided on the master 30 versus the lighting control device 50, the antenna PC boards 326 and 526 are designed according to the same constraints, i.e., as described above, to fit within an electrical wall box, or within the faceplate area, so that they are of compact design; suitable for receiving and transmitting radio frequency signals; substantially far-field isotropic so that they are of particular use in confined areas such as buildings; having a narrow bandwidth and thus insensitive to extrinsic and out-of-band electromagnetic interference and interference caused by accompanying control circuits; of small size to fit into confined spaces and in particular, sized so that it is no larger than the faceplate for a standard electrical wallbox opening; capable of reception and transmission effectively despite the size of the antenna being much smaller than the operating wavelength; of particular use with local control device and master units of RF controlled lighting control systems; sized so as to take maximum advantage of the small space available in electrical wall boxes but allowing other components, including mechanical actuation components and user indicators, for example, optical waveguides, to be incorporated in the wall box; of stable impedance relative to the environment and relatively insensitive to the environment; having an essentially capacitive impedance which is compensated by built-in inductive loading provided by the metal layout on the PC board; concealed from view having no dangling or aesthetically displeasing visible antenna; providing an evanescent field substantially on the edges of the antenna printed circuit board, cost effective and eliminating the need for expensive and bulky a.c. network isolation electrical circuits but yet being completely insulated from the user; and capable of operation with two wire light dimmers having no neutral connection.

Figure 4:
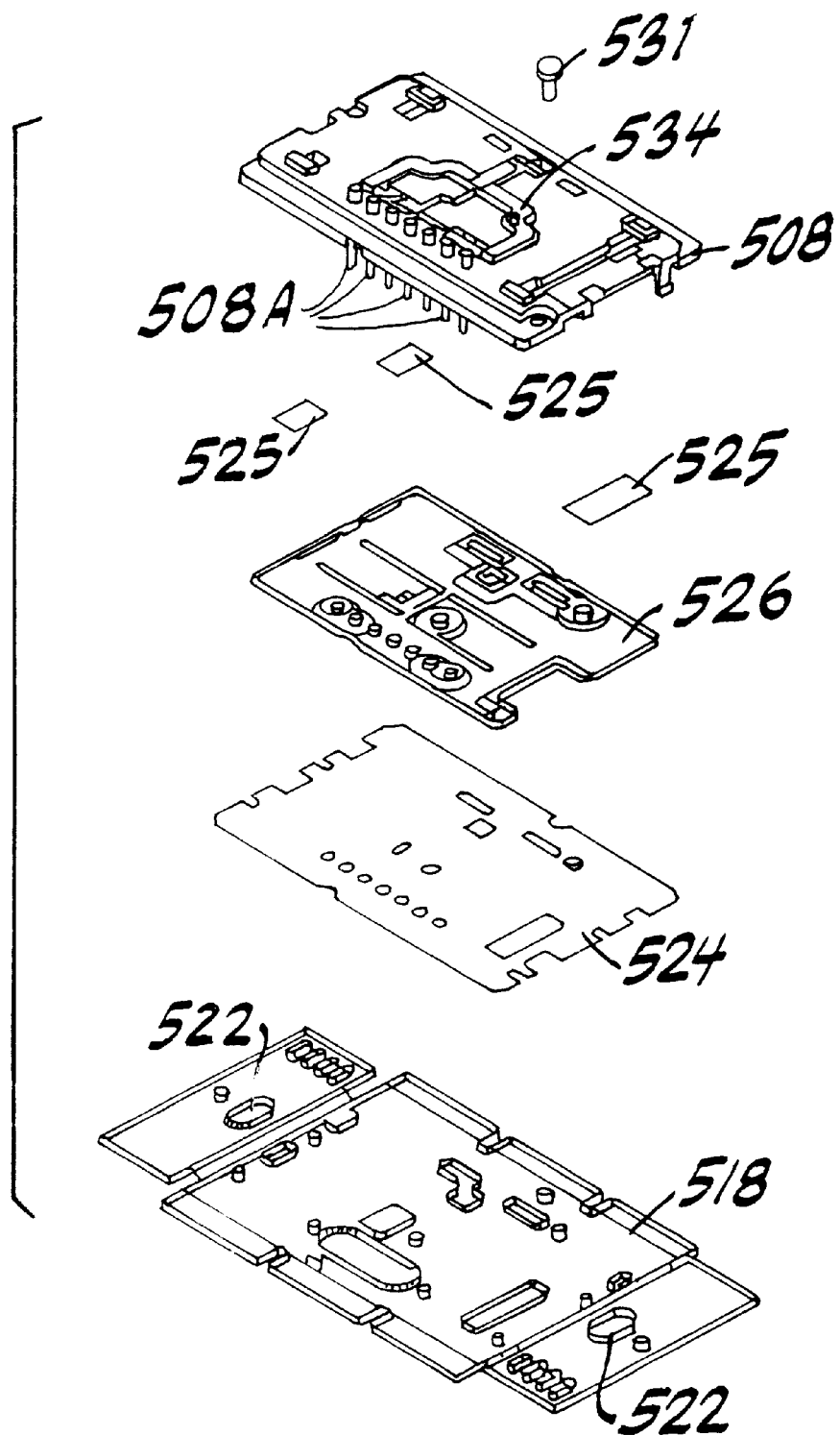
FIG. 4 shows details of portions of FIG. 2.
Figure 5A:
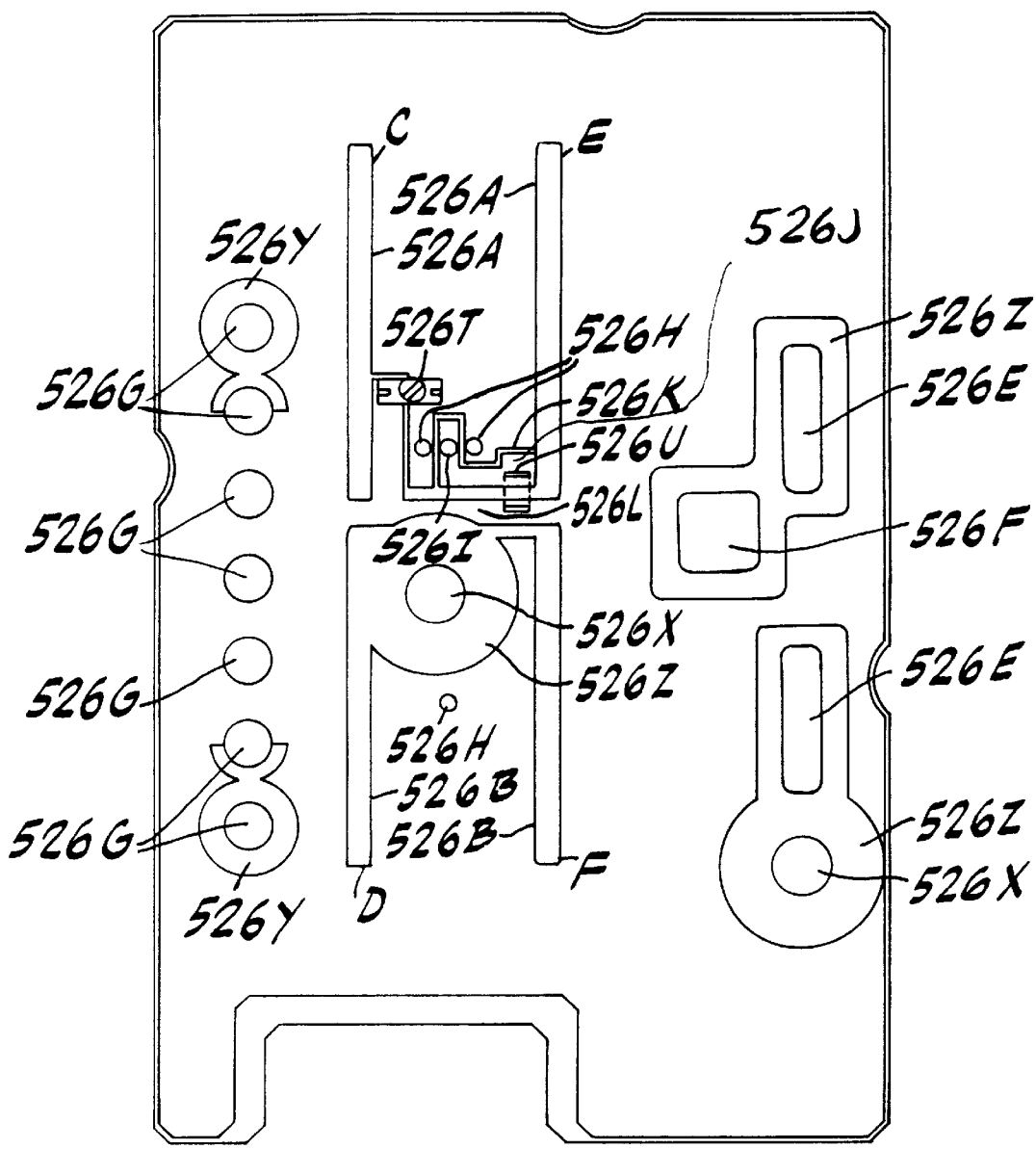
FIG. 5A is a plan view of a first embodiment of one side of the antenna printed circuit board according to the present invention.
Figure 5B:
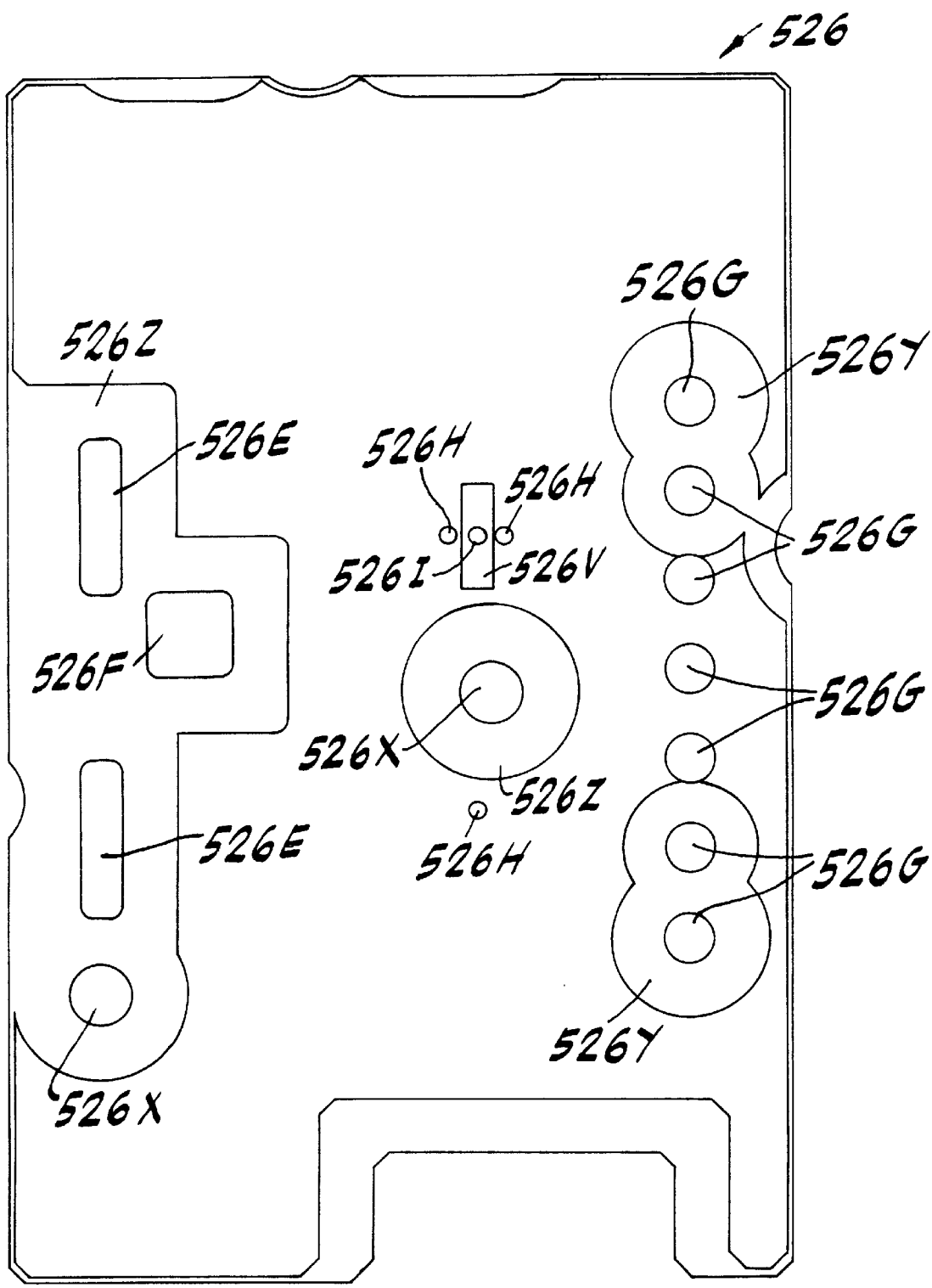
FIG. 5B is a plan view of the other side of the antenna printed circuit board of FIG. 5A.

FIG. 4 shows details of one embodiment of the antenna shown in FIG. 2 and provided with the lighting control device. This embodiment of the antenna board 526 is shown in plan views in FIGS. 5A and 5B. FIG. 5A shows the outwardly facing side of the antenna board and FIG. 5B shows the side facing the yoke. The antenna comprises a printed circuit board 526 having a metallized land pattern (e.g., copper) and preferably not solder plated, disposed on both upper and lower surfaces.

Figure 6:
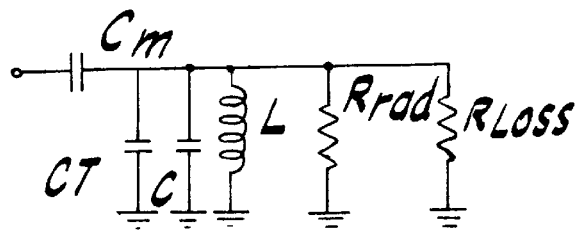
FIG. 6 is a schematic diagram of the equivalent circuit of the antenna according to the present invention.

Preferably, the printed circuit board substrate is made of a low loss dielectric material and the copper plating should not be solder plated since the solder is more lossy than the copper, and at the radio frequencies used (preferably 418 MHz), the current flows only in a small skin depth at the surface of the conductors. On the outwardly facing surface shown in FIG. 5A, the metallized land pattern is shaped so that it contains an H slot 526A, 526B. The H slot 526A, 526B provides inductive loading to an otherwise capacitive antenna. The equivalent circuit for the antenna printed circuit board 526 is shown in FIG. 6.

Also provided in the printed circuit board are elongated openings 526E which are provided for the extension of downwardly depending levers of the up/down rocker 538 and which operate switches mounted on printed circuit board 506 to control the microprocessor and hence the intensity setting of the electrical lamp. Further, an opening 526F is also provided through which a downwardly depending lever of hinge bar 534 actuates a switch to control the on/off status of the lamp, as described previously. Holes 526X are provided for clearance for the threaded ends of mounting screws 520 for the power semiconductor devices 514 and 515. See FIG. 2. The metallization surrounding openings 526E, 526F and 526X are removed to locations distant from the edges of the openings to provide electrical isolation from the yoke and other metal parts such as screw ends 520. The removed areas are shown by designation 526Z.

The printed circuit board is also provided with a plurality of light pipe openings 526G which receive the light pipes of the sub-bezel 508 for providing the operator with a visual indication of the intensity level of the connected lamp. Certain of the light pipe openings 526G have the metallization removed to points distant from the edges of the opening 526G in order to provide isolation from the metal yoke 518, as indicated at 526Y.

In addition, a plurality of feedthroughs 526H are provided which couple the top surface metallization to the back surface metallization to provide an RF ground for the antenna. As shown, there are preferably three such feedthroughs. Furthermore, an RF signal feedthrough 526I is provided. The feedthrough 526I couples the output of the RF board 502 to a metallization 526J. The metallization 526J is insulated via an insulating pattern 526K formed in the metallization. The RF signal connection to the antenna preferably is capacitively coupled to the antenna via a series matching component, capacitor 526U, for example a surface mount chip capacitor, Cm of FIG. 6, which is connected from metallization 526J to metallization 526L. A parallel adjustable trimmer capacitor 526T preferably is provided to trim out the manufacturing variation of the antenna. These variations include thickness of the substrate, dielectric constant of the substrate and etching tolerances of the metallization. Trimmer 526T is shown by a capacitance CT in FIG. 6. On the backside of the antenna board (FIG. 5B), the metallization is removed in a rectangular area 526V to provide isolation for the hot feedthrough 526I from the surrounding metallization.

The H slot 526A, 526B formed in the metallization provides inductive loading to the otherwise capacitive antenna. The capacitance of the antenna is determined primarily by the copper area, substrate thickness, and substrate dielectric constant. At the design frequency, the capacitive reactance is tuned out by the inductive reactance. The inductance depends on the length, shape and positioning of the slots 526A and 526B of FIG. 5A. The amount of the capacitance has a direct effect on the inductive loading required. This relationship determines the lengths of the slots 526A, 526B of the H patterns required. In the far-field, the radiation pattern is substantially isotropic, i.e., the antenna has a low gain. At the printed circuit board edges, evanescent fields are provided. These features are desirable in a system of the type described.

The inductance component is directly related to the slot lengths, i.e., the length of the slot from point C to point D and from point E to point F.

FIG. 6 is a schematic diagram of the equivalent circuit of the antenna. The antenna equivalent circuit includes a series matching capacitance Cm as described above connected between the metallization 526J and 526L, a trimmer capacitance CT as described above, a capacitance C which is determined primarily by the substrate thickness, dielectric constant and the area of the copper, and an inductive component L determined primarily by the length of the slots from C to D and E to F. In addition, the equivalent circuit includes $R_{rad}$ representing the radiated component of the energy and $R_{loss}$ representing the losses due to finite resistance of the metal and the dielectric losses.

Illustrative values of Cm and CT, for a TEFLON based substrate No. R03010 manufactured by Rogers Corp., Microwave and Circuit Materials Div., 100 South Roosevelt Avenue, Chandler, Ariz. 85226, having a dielectric constant of 10.2 and thickness of 0.050 inches are as follows:

Cm=approx. 3 pf

CT=approx. 1–6 pf trimmer.

The preferred embodiment of the antenna has a substrate having a dielectric constant, given the size of the substrate, which prevents the antenna from having a resonant length within the length and width of the antenna. Accordingly, matching components are necessary.

Alternatively, the substrate can be chosen such that it has a higher dielectric constant, which allows the substrate to have a resonant length within its length or width. In such case, matching components may not be necessary.

According to the invention, the antenna provides evanescent fields at the printed circuit board edges and a far-field substantially isotropic radiation patterns. In addition, it is relatively unaffected by out-of-band interference and interference caused by the accompanying control circuits, and has a relatively stable impedance despite changing or stable environmental conditions. The radiation patterns of the described antenna are particularly desirable in systems operating in confined areas such as the interiors of buildings.

Furthermore, the antenna can be described as a modified patch antenna which is inherently capacitive. The inductive loading on the surface in the form of the H slots is used to resonate out the capacitance. The length of the slots can vary as the structure changes depending on mechanical constraints, for example. In addition, the slots need not be in the form of an H shape. Any slot shape which accomplishes the necessary inductive loading will suffice. Furthermore, a substrate is not required. The top metallization can be free standing, for example.

Furthermore, the antenna is entirely concealed from the user. There are no dangling or displeasing visible antennas associated with the lighting control device with the antenna of the present invention. The antenna is completely enclosed within the lighting control device, and does not interfere with the manual actuating member or the status indication light pipes of sub-bezel 508.

Additionally, because the antenna is completely insulated by the sub-bezel 508 from the user, it can be electrically connected to the a/c power line and need not be isolated therefrom, minimizing the need for any bulky isolation components such as capacitors or isolation transformers.

The antenna according to the present invention is approximately 2¼ inches by 1½ inches, preferably substantially co-extensive with the opening in a single gang electrical wall box. In the preferred embodiment, as shown, it has been designed for operation in the 400–500 MHz range (in particular 418 MHz), but could be used at, or redesigned for, other frequencies.

Figure 7:
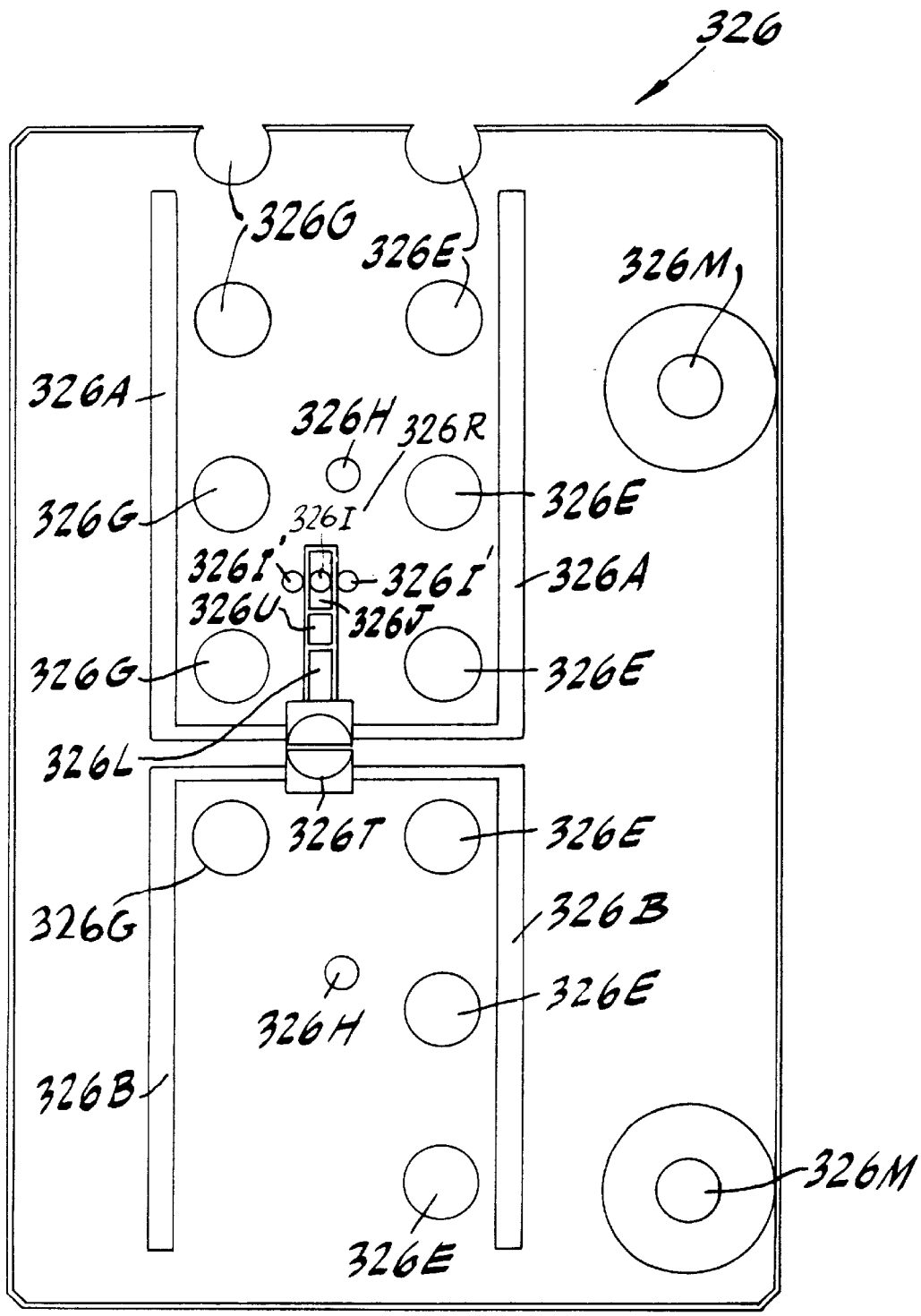
FIG. 7 is a plan view of a first side of embodiment of an antenna for a master control unit according to the invention.
Figure 8:
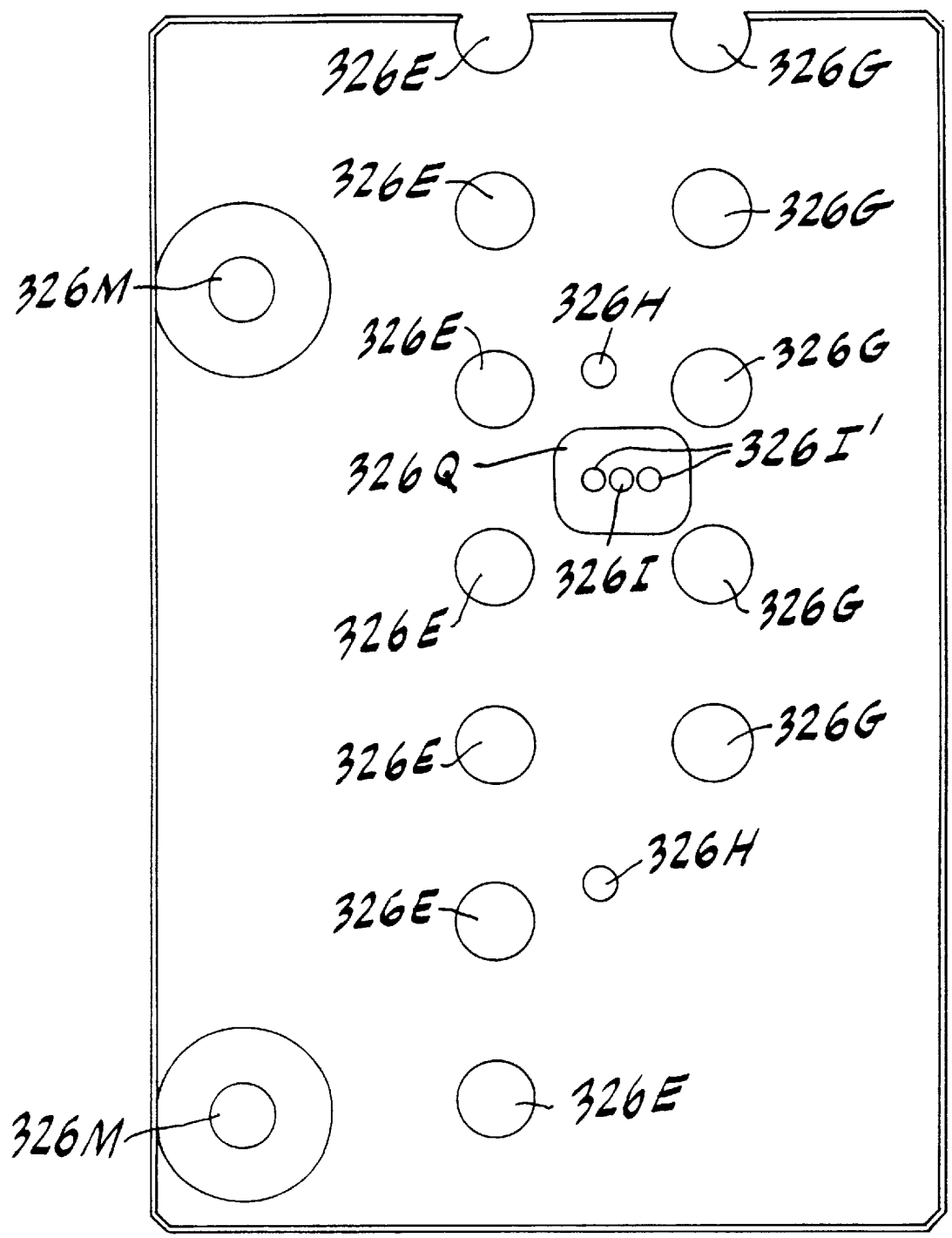
FIG. 8 is a plan view of a second side of the antenna of FIG. 7.

FIGS. 7 and 8 show one embodiment of the antenna 326 of the master unit shown in FIG. 3. FIG. 7 shows the front side of the antenna and FIG. 8 shows the backside. As shown in FIG. 7, the antenna includes an H shaped slot in the metallization comprising portions 326A and 326B. Further provided are a series of openings 326E for actuators associated with local control devices controlling respective lamps. In addition, a plurality of openings 326G are provided for suitable display devices. Holes 326M are provided for mounting screws 327. The metallization is removed from around these holes to provide isolation from the yoke 318. Feedthroughs 326H are provided as in the embodiment for the lighting control device with reference to FIG. 2. A feedthrough 326I is also provided for the antenna hot connection coupled to metallization 326J which is capacitively coupled to the metallization 326L. Two adjacent connection points 326I' to the metallization in area 326R are provided for ground connections of the three pin feed connection 328 providing the RF hot connection to antenna board 326. On the back side (FIG. 8), a rectangular area 326Q of the backplane metallization is removed to insulate these ground connections from the backplane metallization. A series capacitance 326U and a parallel adjustable trimmer capacitance 326T are provided as in the embodiment of FIG. 5A. The capacitance values are approximately the same as in the embodiment of FIG. 5A for the same substrate.

In contrast to the embodiment shown in FIGS. 5A and 5B, in the embodiment for the master unit antenna shown in FIGS. 7 and 8, the H pattern is of different size because of the mechanical configuration of the master device. However, the same electrical considerations guide the design of the H pattern as in the embodiment of FIGS. 5A and 5B.

The characteristics of the antenna can be modified to accommodate varied manufacturing and mechanical constraints. The inductance is varied by changing the length of the slots. The capacitance increases when the slots are decreased in size and vice versa. As stated, the antenna land pattern need not be in the form of a H pattern. Any configuration in which provides the required inductive loading is sufficient.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An electrical control device adapted to be mounted at least partly within an electrical wall box for controlling the status of a controlled electrical device, the electrical control device comprising:
    a housing;
    a support yoke coupled to the housing, the support yoke having a fastening device for coupling the yoke to the electrical wall box;
    a controllably conductive device contained within the housing for controlling the status of the controlled electrical device;
    a control circuit contained in the housing;
    a transmitter-receiver contained in the housing;
    an antenna, sized to fit within an area defined by a faceplate for an outwardly facing opening of said wallbox;
    said antenna adapted to receive signals from a remote control device and transmit signals to said remote control device, the antenna being coupled to the transmitter-receiver, the transmitter-receiver coupling said signals from the remote central device to said control circuit for remotely controlling said controllably conductive device, said transmitter-receiver receiving signals from said control circuit for providing signals to said remote control device to indicate the status of said controlled electrical device.

2. The device of claim 1, further comprising a display for displaying the status of the controlled electrical device.

3. The device of claim 1, wherein said yoke comprises a metal plate substantially coextensive with said housing and having mounting ears extending therefrom for fastening the yoke to the electrical wallbox, said antenna being disposed on an outwardly facing surface of said yoke and being insulated from said yoke by an insulating element.

4. The device of claim 3, wherein said yoke includes an opening therein for an electrical connection between said transmitter-receiver and said antenna.

5. The device of claim 1 further comprising a manual actuator for controlling the controllably conductive device.

6. The device of claim 5, further comprising an outer bezel disposed over said antenna, the bezel having an opening therein for said manual actuator.

7. The device of claim 5, wherein the antenna includes an opening therein for said manual actuator.

8. The device of claim 1, wherein the controllably conductive device comprises a semiconductor device.

9. The device of claim 1, further comprising an airgap switch in series with the controllably conductive device.

10. The device of claim 1, wherein the antenna comprises an insulating substrate having metallized surfaces thereon providing radio frequency radiating and receiving surfaces.

11. The device of claim 10, wherein the antenna substrate has an opening therein for providing at least one display device to a location visible by a user.

12. The device of claim 1, wherein said controlled electrical device comprises an electric lamp and said control circuit further comprises a dimmer circuit for controlling the intensity of said lamp.

13. The device of claim 1, wherein the antenna comprises:
    an insulating substrate having sides and edges;
    conductors disposed on both sides of the substrate forming a capacitive component;
    at least one of the conductors adapted to radiate radio frequency energy into the environment, said one conductor being electrically coupled to the other conductor, said one conductor having a pattern such that the conductor is absent in areas so as to provide the antenna with an inductive component;
    the at least one conductor further providing a connection to the transmitter-receiver; and
    the antenna providing a near-field which is substantially at the edges and which provides insubstantial electromagnetic field coupling to an electronic circuit disposed adjacent the antenna connected to the antenna and further providing a radiated field substantially isotropic in a far-field.

14. The device of claim 13, wherein the one conductor includes longitudinally extending slots where the conductor is absent to provide said inductive component.

15. The device of claim 14, wherein the slots are formed in the shape of an H-pattern, with areas of the conductor adjacent the H-pattern forming side radiators for providing said near-field.

16. The device of claim 15, wherein the conductors are electrically coupled to the controllably conductive device, and said bezel comprises an insulator disposed over the antenna to electrically isolate the antenna from the environment.

17. The device of claim 13, wherein the substrate is substantially coextensive with an opening in a single gang electrical wall box.

18. The device of claim 13, further comprising an optical indicator coupled to the control circuit, and further comprising an opening in the substrate for the optical indicator so that the optical indicator will be visible in the environment.

19. The device of claim 18, wherein the optical indicator comprises an optical waveguide.

20. The device of claim 13, wherein the substrate has a length and width, the length and width of the substrate being substantially less than a transmit and/or receive free space wavelength of radiation processed by the transmitter-receiver.

21. The device of claim 20, wherein the substrate has a dielectric constant such that the substrate has a resonant length within its length and/or width.

22. The device of claim 1, wherein the transmitter-receiver comprises a radio transmitter-receiver.

23. A remote control device adapted to be mounted at least partly within an electrical wall box, and adapted to control without a wire connection, an electrical control device connected to a controlled electrical device, the remote control device comprising:

a housing;

a support yoke coupled to the housing, the support yoke having a fastening device for coupling the yoke to the electrical wall box;

a control circuit contained in the housing;

a transmitter-receiver contained in the housing;

an antenna, sized to fit within an area defined by a faceplate for an outwardly facing opening of said wallbox;

an outer bezel disposed over said antenna;

at least one actuator extending from said bezel, the actuator being coupled to said control circuit to provide a signal thereto to control the status of the controlled electrical device;

said antenna adapted to transmit signals from the control circuit to said electrical control device and receive signals from said electrical control device, the antenna being coupled to the transmitter-receiver, the transmitter-receiver coupling said signals from said control circuit to the antenna for remotely controlling the electrical control device thereby to control the status of the controlled electrical device and said transmitter-receiver receiving signals from said antenna from the electrical control device for providing signals to said control circuit to indicate the status of said controlled electrical device.

24. The device of claim 23, further comprising a display for displaying the status of the controlled electrical device.

25. The device of claim 23, wherein said yoke comprises a metal plate substantially coextensive with said housing and having mounting ears extending therefrom for fastening the yoke to the electrical wallbox, said antenna being disposed on an outwardly facing surface of said yoke and being insulated from said yoke by an insulating element.

26. The device of claim 25, wherein said yoke includes an opening therein for an electrical connection between said transmitter-receiver and said antenna, and at least one opening for said actuator.

27. The device of claim 23, wherein the controlled electrical device comprises an electric lamp.

28. The device of claim 23, wherein the antenna comprises an insulating substrate having metallized surfaces thereon providing radio frequency radiating and receiving surfaces.

29. The device of claim 28, wherein the antenna substrate has an opening therein for providing at least one display device to a location visible by a user.

30. The device of claim 23, wherein the antenna comprises:

an insulating substrate having sides and edges;

conductors disposed on both sides of the substrate forming a capacitive component;

at least one of the conductors adapted to radiate radio frequency energy into the environment, said one conductor being electrically coupled to the other conductor, said one conductor having a pattern such that the conductor is absent in areas so as to provide the antenna with an inductive component;

the one conductor further providing a connection to the transmitter-receiver; and the antenna providing a near-field which is substantially at the edges and which provides insubstantial electromagnetic field coupling to an electronic circuit disposed adjacent the antenna connected to the antenna and further providing a radiated field substantially isotropic in a far-field.

31. The device of claim 30, wherein the one conductor includes longitudinally extending slots where the conductor is absent to provide said inductive component.

32. The device of claim 31, wherein the slots are formed in the shape of an H-pattern, with areas of the conductor adjacent the H-pattern forming side radiators for providing said near-field.

33. The device of claim 30, wherein the conductors are electrically coupled to the control circuit, and further comprising an insulating bezel disposed over the antenna to electrically isolate the antenna from the environment.

34. The device of claim 30, wherein the substrate has a dielectric constant such that the substrate has a resonant length within its length and/or width.

35. The device of claim 30, wherein the substrate is substantially coextensive with an opening in a single gang electrical wall box.

36. The device of claim 30, further comprising an optical indicator coupled to the control circuit, and further comprising an opening in the substrate for the optical indicator so that the optical indicator will be s visible in the environment.

37. The device of claim 36, wherein the optical indicator comprises an optical waveguide.

38. The device of claim 30, wherein the substrate has a length and width, the length and width of the substrate being substantially less than a transmit and/or receive free space wavelength of radiation processed by the transmitter-receiver.

* * * * *

UNITED STATES PATENT AND TRADEMARK OFFICE
CERTIFICATE OF CORRECTION

PATENT NO. : 5,982,103  
DATED : November 9, 1999  
INVENTOR(S) : Donald Mosebrook Page 1 of 1

It is certified that error appears in the above-identified patent and that said Letters Patent is hereby corrected as shown below:

Column 4,  
Line 19, change "Particular" to -- particular --.

Column 8,  
Line 65, after "herewith" insert -- , now U.S. Patent No. 5,848,054 --.

Column 15,  
Line 49, change "central" to -- control --.

Signed and Sealed this

Second Day of May, 2006

JON W. DUDAS  
*Director of the United States Patent and Trademark Office*

(12) EX PARTE REEXAMINATION CERTIFICATE (10389th)
United States Patent
Mosebrook et al.

(10) Number: US 5,982,103 C1
(45) Certificate Issued: Nov. 10, 2014

(54) COMPACT RADIO FREQUENCY TRANSMITTING AND RECEIVING ANTENNA AND CONTROL DEVICE EMPLOYING SAME

(75) Inventors: Donald R. Mosebrook, Bethlehem, PA (US); Richard C. Compton, Ithaca, NY (US); Joel S. Spira, Coopersburg, PA (US)

(73) Assignee: Lutron Electronics, Co., Inc., Coopersburg, PA (US)

Reexamination Request:
No. 90/012,921, Jul. 26, 2013

Reexamination Certificate for:
Patent No.: 5,982,103
Issued: Nov. 9, 1999
Appl. No.: 09/013,125
Filed: Jan. 26, 1998

Certificate of Correction issued May 2, 2006

Related U.S. Application Data

(62) Division of application No. 08/598,239, filed on Feb. 7, 1996, now Pat. No. 5,736,965.

(51) Int. Cl.
| | |
|---|---|
| *H01Q 1/22* | (2006.01) |
| *H01Q 9/40* | (2006.01) |
| *H01Q 1/38* | (2006.01) |
| *H01Q 1/24* | (2006.01) |
| *H02J 13/00* | (2006.01) |
| *H01Q 9/04* | (2006.01) |
| *H01Q 13/10* | (2006.01) |
| *H01Q 1/00* | (2006.01) |
| *H04B 1/38* | (2006.01) |

(52) U.S. Cl.
USPC .......... 315/149; 315/312; 343/702; 455/90.3

(58) Field of Classification Search
None
See application file for complete search history.

(56) References Cited

To view the complete listing of prior art documents cited during the proceeding for Reexamination Control Number 90/012,921, please refer to the USPTO's public Patent Application Information Retrieval (PAIR) system under the Display References tab.

*Primary Examiner* — John M. Hotaling, II

(57) ABSTRACT

A radio frequency antenna for use with a wall mounted transmitter and/or receiver for receiving and/or transmitting signals adapted to control a control device and/or indicate status of the control device. The antenna includes an insulating substrate sized to fit within an area defined by a faceplate sized to cover an outwardly facing opening of an electrical wallbox. Conductors are disposed on both sides of the substrate forming a capacitive component. At least one of the conductors is adapted to radiate radio frequency energy into the environment. The one conductor is electrically coupled to the other conductor, and the one conductor has a pattern such that the conductor is absent in areas so as to provide the antenna with an inductive component. The at least one conductor further provides a connection to the transmitter and/or receiver. The antenna provides an antenna near-field which is substantially at the edges of the substrate and which provides insubstantial electromagnetic field coupling to an electronic circuit disposed adjacent the antenna connected to the antenna and further provides a radiated field substantially isotropic in the antenna far-field.

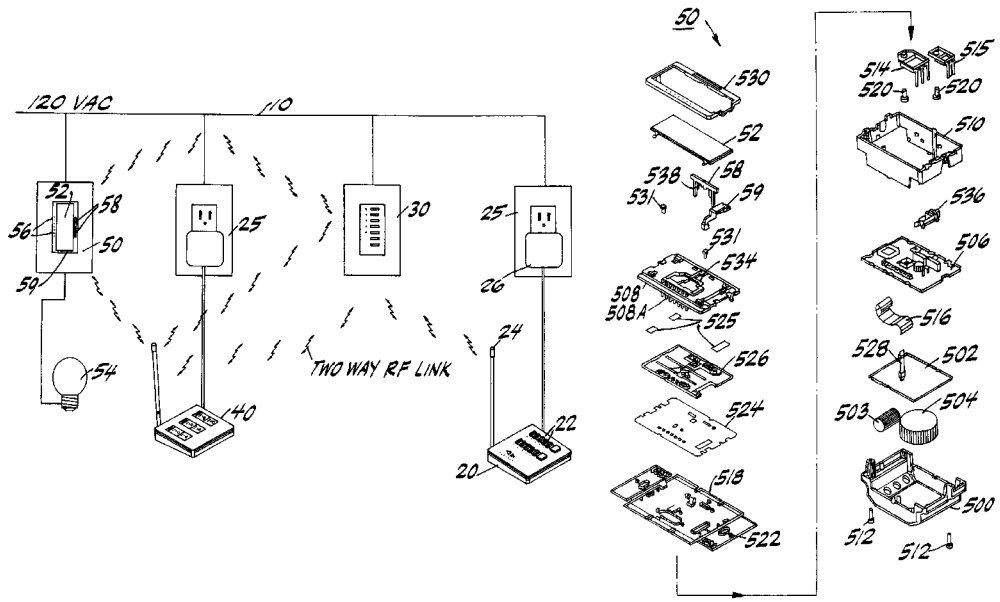

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3, 5, 6, 8, 9, 12, 22-25 and 27 is confirmed.

Claims 4, 7, 10, 11, 13-21, 26 and 28-38 were not reexamined.

* * * * *